G. W. DAIMLER.
Air and Gas Engine.
No. 168,623. Patented Oct. 11 1875.
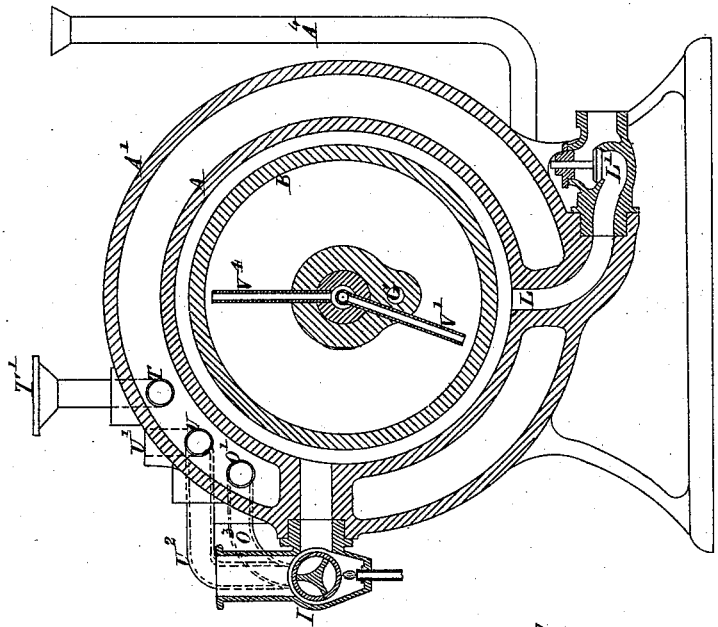
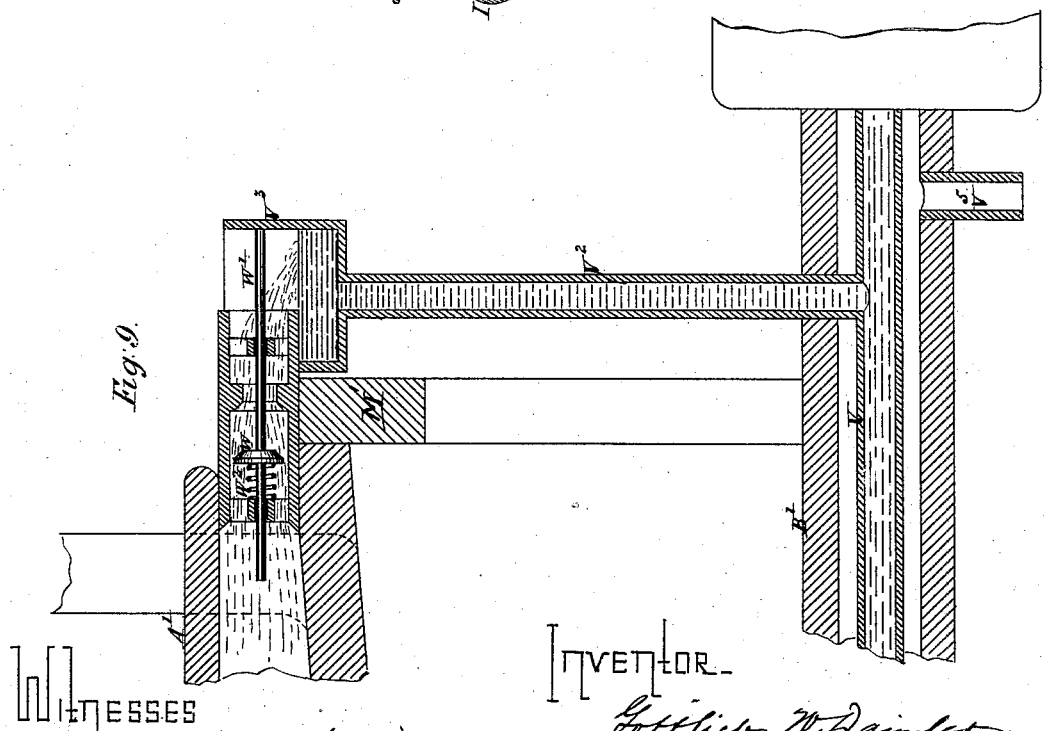

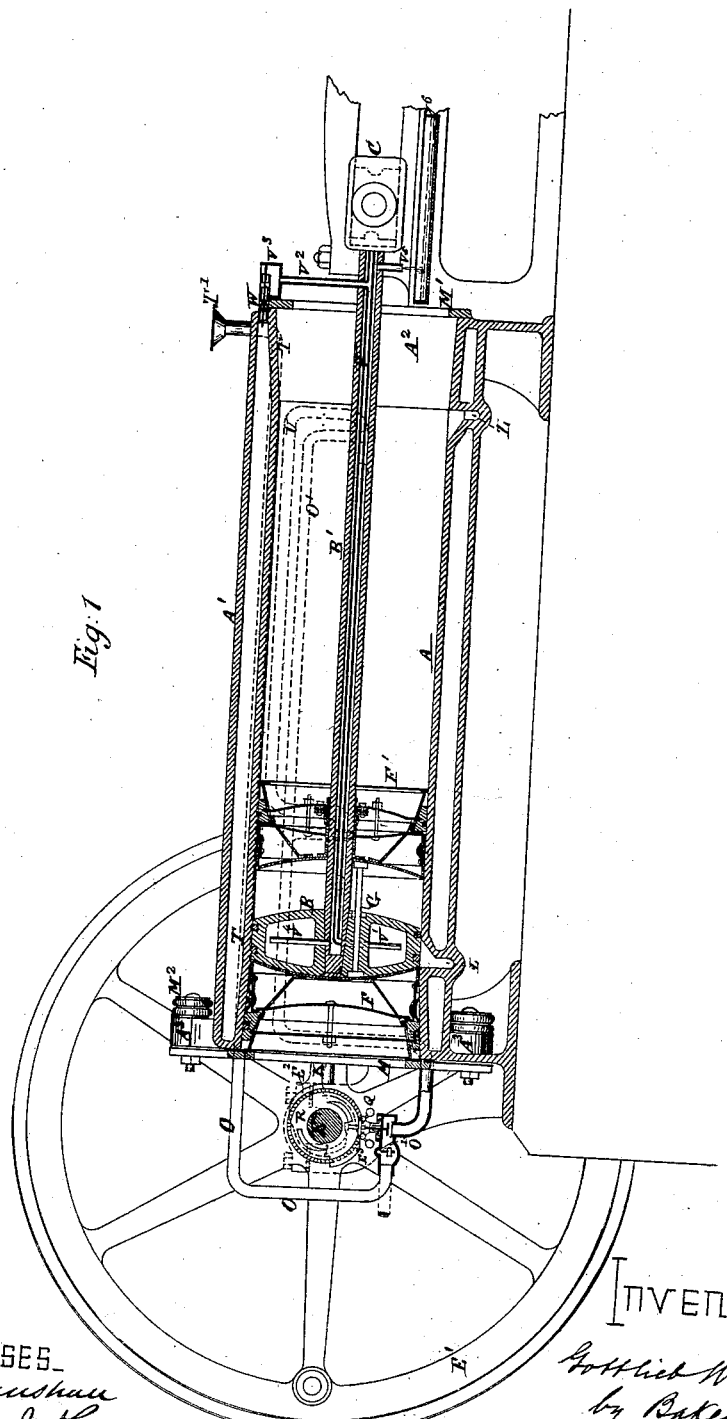

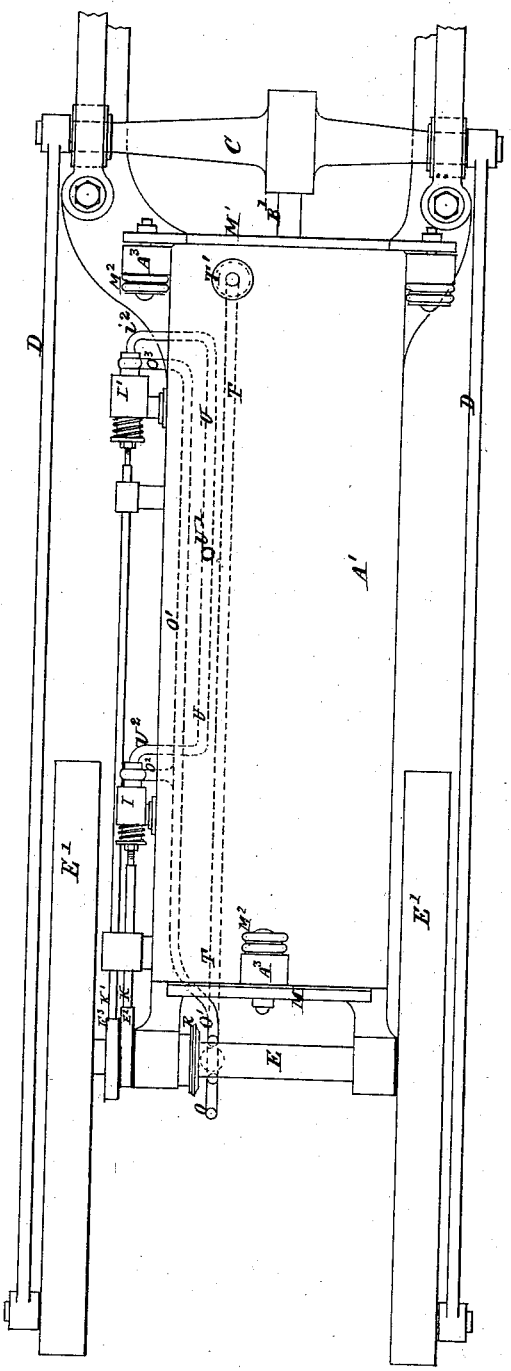

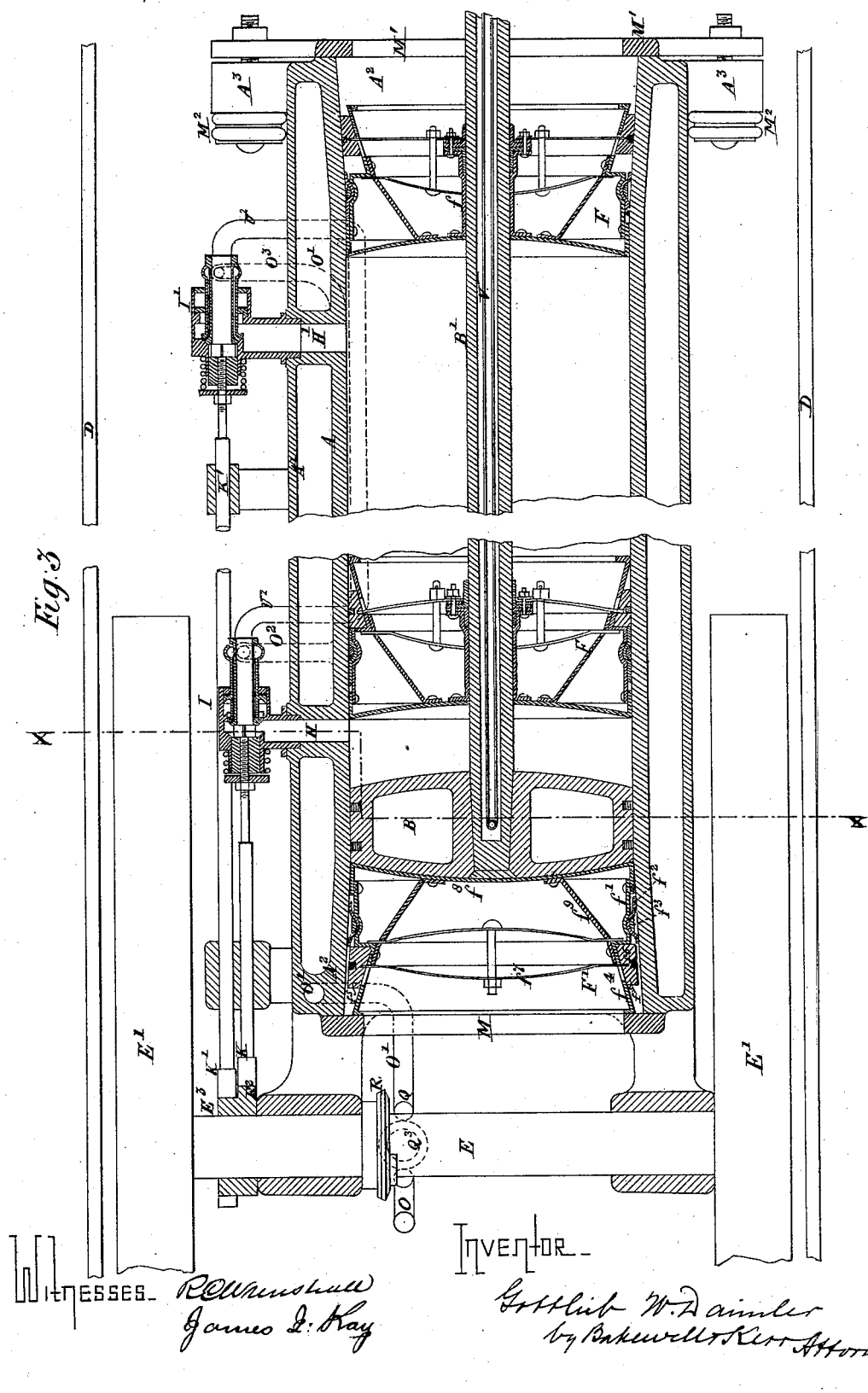

6 Sheets--Sheet 5.
G. W. DAIMLER.
Air and Gas Engine.
No. 168,623. Patented Oct. 11, 1875.
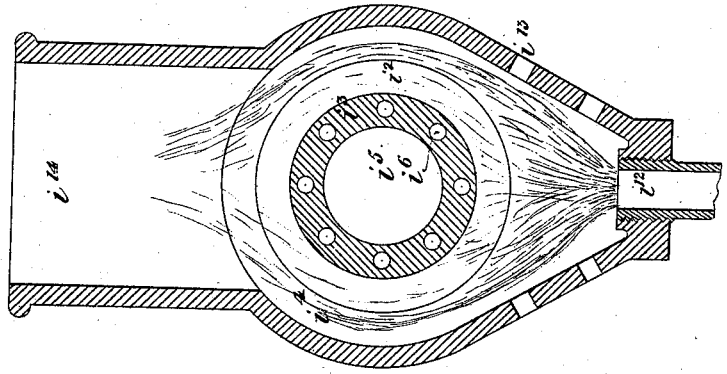
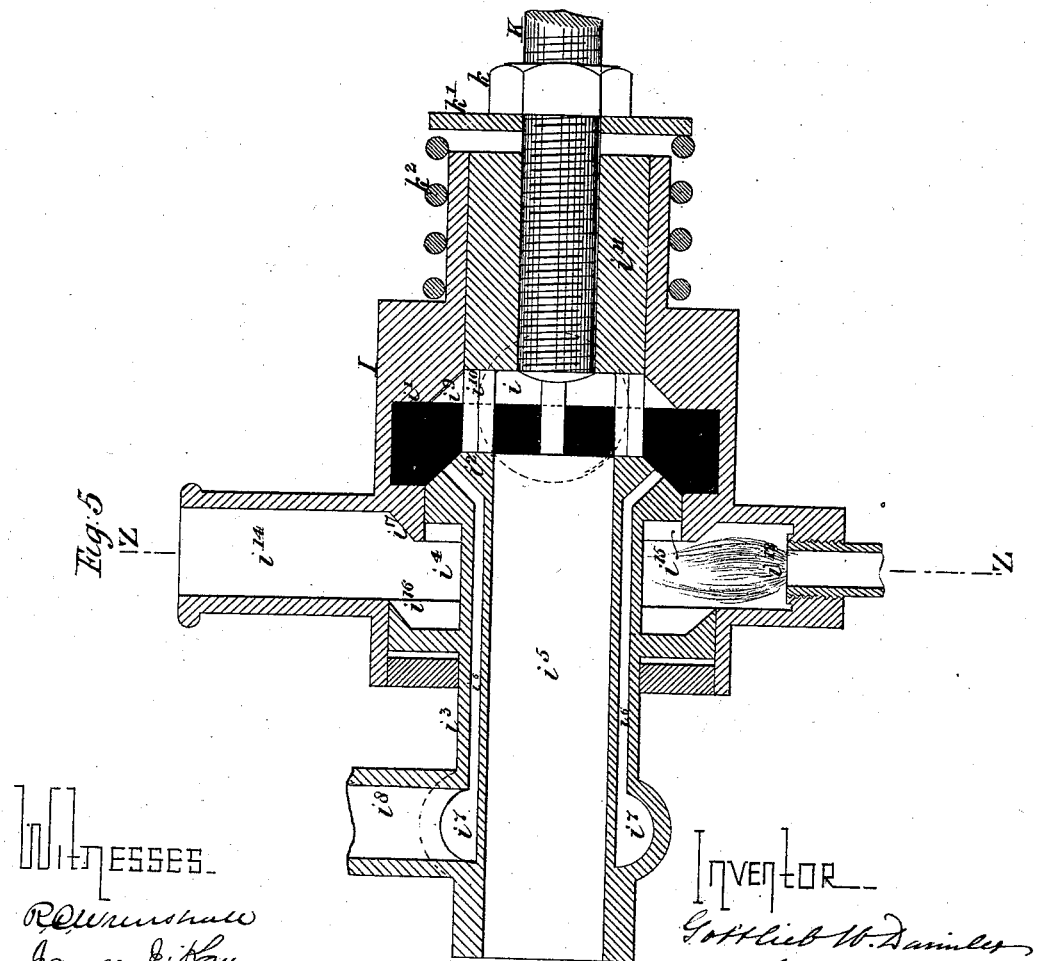

G. W. DAIMLER.
Air and Gas Engine.
No. 168,623.
6 Sheets--Sheet 6.
Patented Oct. 11, 1875.
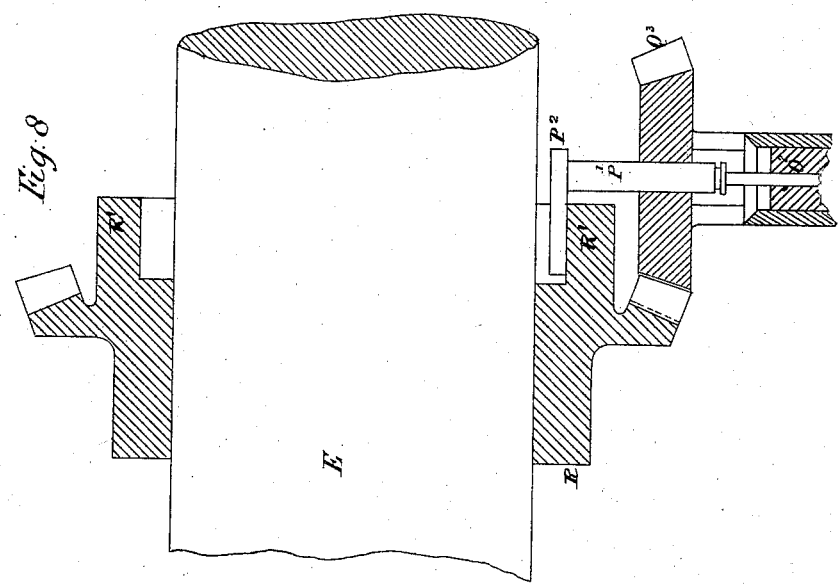
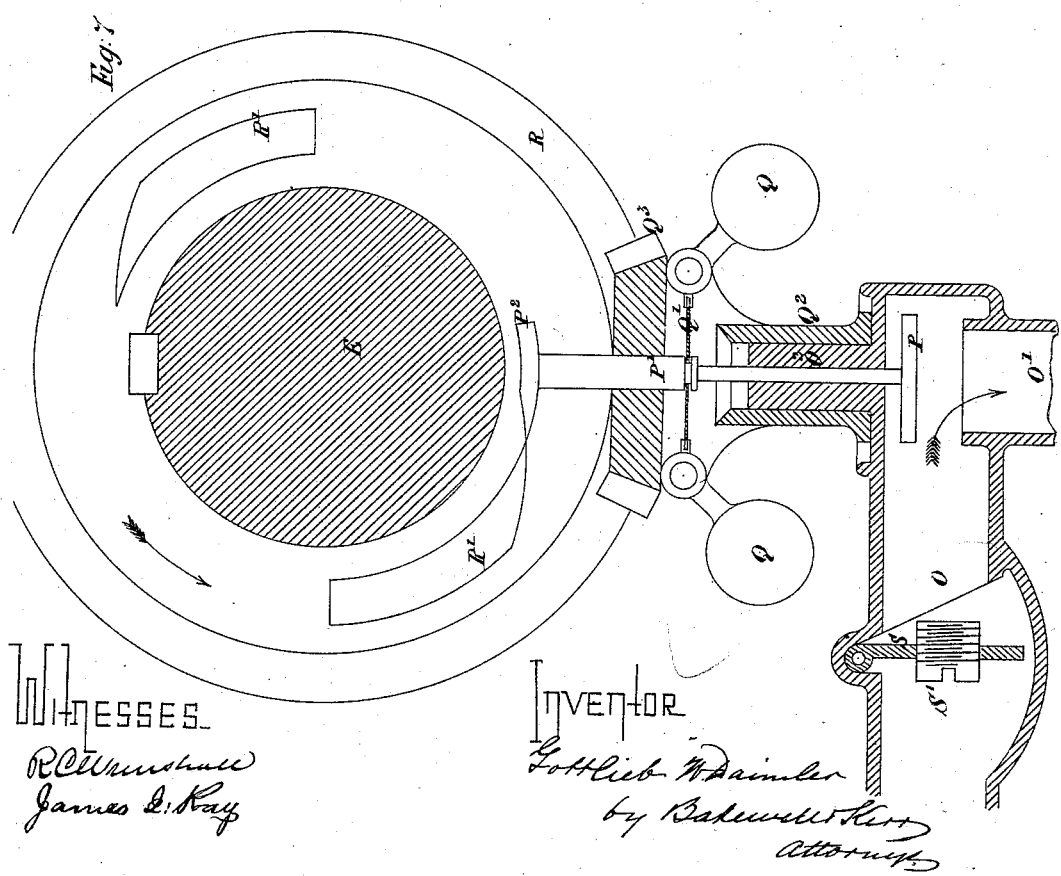

UNITED STATES PATENT OFFICE.

GOTTLIEB WILHELM DAIMLER, OF MUELHEIM-ON-THE-RHINE, GERMANY.

IMPROVEMENT IN AIR AND GAS ENGINES.

Specification forming part of Letters Patent No. 168,623, dated October 11, 1875; application filed April 17, 1875.

*To all whom it may concern:*

Be it known that I, GOTTLIEB WILHELM DAIMLER, of Muelheim-on-the-Rhine, in the German Empire, have invented an Improved Engine worked by Gas or Combustible Vapor and Air; and do hereby declare that the following description, taken in connection with the accompanying sheets of drawings, hereinafter referred to, forms a full and exact specification of the same, wherein I have set forth the nature and principles of my said improvement, by which my invention may be distinguished from others of a similar class, together with such parts as I claim and desire to secure by Letters Patent—that is to say:

My invention relates to that class of engines wherein, by the explosion of a mixture of combustible gas or hydrocarbon vapor and air inside a cylinder, a loose piston is propelled without doing work, so as, by the expansion and cooling of the products of combustion, to produce a partial vacuum in the cylinder, thereby causing a working piston to be propelled by atmospheric pressure.

Such a construction of engine is described in the specification to British patents granted to R. A. Brooman, dated 24th August, 1863, No. 2,098, and to F. W. Wenham, dated 9th May, 1864, No. 1,173.

According to my present invention, a water-jacketed cylinder, open to the atmosphere at both ends, contains, first, a working piston; and, secondly, two other pistons, one on each side of the working piston, which are loose or unconnected, and operate in conjunction with the working piston in the following manner: Assuming the working piston to be at end of back stroke, a charge of gas and air is drawn into a space between it and the front loose piston, and is exploded. The said loose piston is thrown by the explosion to the front end of the cylinder, (without doing work,) where it is held by means to be hereafter described, whereupon, a partial vacuum being formed in the cylinder by the expansion and cooling of the gaseous products of combustion, the working piston will, by atmospheric pressure, be caused to perform its forward stroke, the back loose piston traveling with it. On approaching the front loose piston the back loose piston is arrested in its motion, while the working piston completes its stroke, moving close up to the front loose piston, and expelling the products of combustion from between them, while at the same time a charge of gas and air is drawn into the space formed between the working piston and the back loose piston. On the charge being exploded the back loose piston is thrown to the back end of the cylinder, and the working piston performs its back stroke, together with the front loose piston, and the operation is repeated as above described.

Thus it will be seen that my improved engine is double-acting, and the reciprocating motion of the working piston may either be utilized directly where reciprocating motion is required, such as in pumping-engines and the like; or it may be converted into rotary motion by connecting the piston-rod to a crank on an engine-shaft.

I will now proceed more particularly to describe the construction and mode of operating of my improved engine, for which purpose I shall refer to the accompanying drawings, in which—

Figure 1 shows a longitudinal section of the engine. Fig. 2 shows a plan of the same. Fig. 3 shows a part sectional plan to an enlarged scale. Fig. 4 shows a transverse section on line X X, Fig. 3; and Figs. 5 to 9 show enlarged details.

The engine as represented on the drawings is supposed to be a horizontal one. It may, however, be arranged in an inclined or vertical position. The cylinder A, provided with a cold-water jacket, $A^1$, is open at both ends to the atmosphere, and it is, at each end, somewhat conically enlarged, as indicated at $A^2 A^2$. B is the working piston, connected by piston-rod B', cross-head C, and connecting-rods D to crank-pins on the fly-wheels $E^1 E^1$ on the engine-shaft E. The piston and piston-rod are hollow, and cold water is made to circulate through them by means to be hereafter described. On each side of the piston B is a loose piston, F F', the piston-rod B' being made to work air-tight through a gland, $f$, provided with packing in the piston F. These loose pistons are of very light construction, consisting, first, of a cylindrical part, $f^1$, which carries a broad ring of leather or other material, $f^2$, acting as a packing, secured at its middle by a metal ring, $f^3$, so that the pressure existing on one side or the other of the piston tends to press the leather ring against the cylinder in a similar manner to an ordinary cup leather, and thus causes the piston to work air-tight in the cylinder. The piston consists, further, of a coned part, $f^4$, upon which is fitted a loose conical ring, $f^5$, formed in segments that are held together by a small ring, $f^6$, fitting into a groove in all the segments. This segment-ring is connected to springs $f^7$, which springs tend to keep the segment-ring at the smallest diameter of the part $f^4$, as shown at Fig. 1, in which case, the segments being retracted, they allow the piston to move freely in the cylinder. When, however, the loose piston is propelled by the explosion of the gas and air into the conical enlargement $A^2$ of the cylinder, and is there suddenly arrested by the counter-pressure of the atmosphere, the conical segment-ring $f^5$, in continuing its forward motion by virtue of its momentum, slides up the conical surface $f^4$, and, being thus expanded, wedges itself tight between such conical surface and the conical surface of the cylinder, as indicated at the right-hand end of Fig. 3, and thus the piston F is held securely in this position. The pistons F F' are open to the atmosphere at their outer sides; but at their inner sides they are closed air-tight by means of a curved plate, $f^8$, strengthened by stays $f^9$, and formed to the same curvature as the working piston B, so that this can fit close against the loose pistons, as shown. Passing air-tight through the piston B is a rod, G, Fig. 1, with heads at its ends, and capable of sliding backward and forward through the piston. This rod, in coming in contact with the loose pistons, keeps these a certain distance apart, thus causing a charge of gas and air to be drawn in between the working piston and the one loose piston at the end of every stroke, as will be presently described.

The cylinder A has two ports, H H', for the admission of a charge of gas and air at each end stroke of the working piston, such admission being regulated by valves I I', constructed and operating as will be hereafter described, and worked by means of cams or tappets $E^2$ $E^3$ on the engine-shaft E, acting on rods K K', connected to the valves.

The mode in which the engine operates is as follows: Assuming the working piston B to be at the end of back stroke, resting closely against the loose piston F', and with a space intervening between it and the second loose piston F, as shown at Figs. 1 and 3, and assuming, further, that a charge of gas and air has been admitted into this space through the valve I, and is then ignited, then upon the explosion taking place the piston F will be rapidly propelled to the front end of the cylinder into the second position thereof. (Shown at the right-hand end of Fig. 3.) The gaseous products of the explosion being rapidly cooled by their expansion, and by the cooling action of the water-jacket $A^1$ and the cooled piston and piston rod, a partial vacuum will be formed in the cylinder, in consequence whereof the motion of the piston F will be arrested when it has arrived at or about the right-hand position shown in Fig. 3, by the counteracting pressure of the external atmosphere. The segment-ring $f^5$, in continuing its motion, by virtue of its inertia, will wedge the piston F tight in this position, as before explained; and it will be seen that, owing to the conicity of the part $A^2$ of the cylinder, the piston F will be held in this position, not merely by frictional contact, but by absolute pressure, acting counter to that exerted by the atmosphere. In consequence of the partial vacuum existing in the cylinder the working piston B and the second loose piston F' will now be caused by the external atmospheric pressure to travel together toward the front end of the cylinder, the packing $f^2$ of the piston F' acting in aid of the piston B to insure an air-tight contact with the sides of the cylinder. When the piston B has arrived near the end of its forward stroke the rod G, projecting therefrom, in coming in contact with the piston F arrests the motion of the piston F', so that as the working piston continues to advance toward the piston F a space is formed between its back surface and the piston F', and the valve I' being now opened a charge of gas and air will be drawn into the cylinder between the pistons B and F'. At the same time the piston B, in approaching the piston F, forces out the condensed products of combustion contained between them through an escape-passage, L, Figs. 1 and 4, provided with a check-valve, L'. The force of the explosion is so regulated that the piston F, in its flight, is arrested somewhat short of the full stroke of the piston B, so that when the latter comes in contact with the former it pushes it outward from the right-hand position (shown in Fig. 3) up to the extreme end of the cylinder—that is, into the position in which the piston F' is shown. By this means the segment-ring $f^5$, being released from its jammed position, will be caused by the springs $f^7$ to move into the retracted position shown in the piston F', so that the piston is now loose in the cylinder. The explosive charge drawn in between the pistons B and F' being ignited, the piston F' is propelled to the back end of the cylinder, where its flight is arrested, as before described with reference to F, and the pistons B and F now perform their back stroke, the piston F being arrested by the rod G near the end of its stroke, in order to draw in a fresh charge of explosive mixture, and so on. At the extreme end of each stroke the piston B presses the pistons F F' slightly against annular buffer-plates M $M^1$, held in a yielding manner against the ends of the cylinder by means of bolts passing through lugs $A^3$ on the cylinders, with india-rubber washers $M^2$ at the back. The object of this arrangement is to insure that all the products of combustion shall be forced out from between the pistons B and F F', and that the latter shall fit closely against the former while performing their stroke.

Instead of arresting the motion of the loose pistons by the rod G, as described, this may be effected by means of catches or stops actuated by the engine-shaft, (or by the stem of the admission-valves,) so as to project through the side of the cylinder at the required time and place, and thus stop the loose piston. As I have before stated, the packing of the loose pistons F F' operates in aid of the packing of the piston B, as they follow the latter closely while it performs its stroke, and, as a consequence of this, it will be evident that the operation of the engine may be modified by making the piston B to work loosely or without packing, acting simply as a disk, the loose pistons being made to act alternately as the working piston in pressing against the piston or disk B, when caused to perform their stroke by the atmospheric pressure, and thus imparting motion to the engine-shaft through the piston-rod B'.

The construction of the valve-gear I I' for admitting the charge of combustible gas and air into the cylinder, and the arrangement for igniting the charge, are shown at Figs. 5 and 6, which show, respectively, an enlarged longitudinal section and a transverse section on line Z Z, of the valve-gear. The valve-casing I communicates with the cylinder-port H by a passage, $i$, opening into the chamber $i^1$. In this chamber is a conical valve, $i^2$, fitting against a seat, $i^9$, and having a stem, $i^3$, of large diameter, passing through a second chamber, $i^4$, in the valve-casing, and out through the end thereof. The stem $i^3$ has a central passage, $i^5$, passing right through it, which serves for the admission of atmospheric air, and round this are formed a number of small passages, $i^6$, communicating at the one end with an annular passage, $i^7$, which is connected by a nozzle, $i^8$, to a flexible gas-supply pipe. At the other end the passages $i^6$ open into the open face of the conical valve $i^2$. Thus when the valve is away from its seat, as shown in Fig. 5, air and gas will pass through the passages $i^5$ and $i^6$ into the chamber $i^1$, whence the explosive mixture will pass into the cylinder; but when the valve is closed the supply of gas and air will be simultaneously cut off.

The valve is actuated in the following manner: It is connected by bars $i^{10}$ with a piece, $i^{11}$, working air-tight in the front end of casing I, to which piece is attached the rod K, that receives motion from the cam $E^2$ on the engine-shaft. Upon this rod is an adjustable nut, $k$, and plate $k^1$, against which presses a spiral spring, $k^2$, that abuts against a shoulder on the valve-casing. Thus the rod K, being acted upon by the cam $E^2$, pushes the valve open at the proper time for the admission of air and gas, and on the nose of the cam leaving the end of the rod the spring $k^2$, acting against the plate $k^1$, pushes the rod back, and so closes the valve with a rapid motion, which can be regulated by screwing the nut $k$ more or less on the rod K, so as to regulate the pressure of the spring. In the bottom of the chamber $i^4$ is a gas-jet, $i^{12}$, kept constantly burning, which is supplied with air through the hole $i^{13}$ in the casing, while a chimney, $i^{14}$, is provided at the top of the chamber $i^4$, to promote a draft for the flame, which plays round the stem $i^3$ of the valve. The valve $i^2$ is formed with a cylindrical part, which, when it is open, fits into a circular opening, $i^{15}$, between the chambers $i^1$ and $i^4$, and thus shuts off the communication between these chambers through such opening. As the valve closes it uncovers this opening, and at the same time the disk $i^{16}$ formed on the stem $i^3$, in advancing rapidly, conveys a portion of the flame that is playing round the stem in the chamber $i^4$, through the opening $i^{15}$, into the chamber $i^1$, and then closes the communication between $i^1$ and $i^4$ again by fitting with a beveled rim against the beveled face $i^{17}$. At the same time the flame carried into $i^1$ passes thence through the opening $i$ and port H into the cylinder, and ignites the explosive charge therein.

The power of the engine is regulated by a governor in such a manner that should the speed of the engine be too great the supply of combustible gas is entirely cut off, and the working piston consequently performs its strokes without any explosion of gas and air taking place, until by the reduction of the speed the gas-supply is again fully opened, so that the proper proportions of combustible gas and air, and the quantity of the mixture required for each explosive charge in order to produce the best results, having been determined, these proportions and quantity are not in any way varied for increasing or decreasing the power of the engine. The arrangement for this purpose will be understood on reference to Figs. 7 and 8, which show, respectively, an enlarged transverse section and part longitudinal section of the engine-shaft, with the regulating mechanism.

O O$^1$ is the supply-pipe for combustible gas, which is connected by flexible tubes to the nozzles $i^8$ on the admission-valve, as before described. The gas passes from O into O$^1$ on its way to the engine, as indicated by the arrow. Over the mouth of the pipe O$^1$ is a valve, P, attached to a spindle, P$^1$, passing through a stuffing-box on the pipe, and carried externally by a thin steel plate, Q$^1$, fitting into a neck on the spindle, as shown, and connected to the arms of the governor-balls Q. These are carried by brackets projecting from a sleeve, Q$^3$, which rotates upon the cylindrical gland O$^2$, carrying with it the governor-balls, such rotation being effected by a bevel-pinion, Q$^3$, fixed to the sleeve Q$^2$, and in gear with the bevel-wheel R. fixed on the engine-shaft E. The spindle P$^1$, which does not revolve with the governor, passes through the pinion, and, being extended upward somewhat, is provided at its end with a head, P². This head projects laterally, as shown, so as to pass over or under two projections, R' R', formed on the face of the wheel R. The head P² is formed with a feather-edge presented toward a feather-edge formed on the projections R', and these are formed with inclines, as shown.

From this will be seen that if, while the engine is running at its normal speed, the governor-balls are adjusted so as to hold the spindle with its head at such a height that its feather-edge is just above that of the projections R', these, in rotating, will pass underneath the head, and will thus keep the valve P raised full open during the intervals when a charge of gas and air has to be drawn into the engine-cylinder. If, however, the speed of the engine is slightly increased, the governor will cause the spindle P¹ to be slightly depressed, whereby the feather-edge of P² will be brought slightly below the feather-edge of R', and consequently the inclined surface of the latter, in passing over the head P², will press down the spindle P¹, and will consequently close the valve P, thus entirely cutting off the supply of gas during the time that the admission-valve of the engine is open.

Thus it will be seen that the governor only serves to bring the mechanism into action for cutting off the gas-supply, so that a very slight increase of speed beyond that required at once causes the gas-supply to be entirely cut off, as above described.

In the gas-supply pipe O is a flap-valve, S, which is kept open by a weight, S', that can be screwed more or less through the valve, and thus, by shifting its center of gravity, regulate the extent to which it is kept open. The object of this valve is to prevent more than the regulated quantity of gas for each charge from entering the cylinder, as, should by any chance the loose piston, in following the working piston, stick in the cylinder before completing its stroke, and thus cause an increased suction to take place in the cylinder by reason of the greater space that would be formed between the loose piston and the working piston, then such increased suction, in drawing the gas from the right-hand side of the valve S quicker than it could flow past the valve, would cause the valve to be more or less closed by the pressure behind it, so as to throttle the gas-supply.

As before stated, it is proposed to work the engine either by ordinary coal-gas or by hydrocarbon or petroleum vapors.

If coal-gas is employed, it enters the pipe O through the branch O², shown in dotted lines in Fig. 1, leading from any convenient point of supply, and passes thence through the pipe O¹ O¹, passing along the cylinder, either inside the water-jacket thereof, as shown, or outside the same, and provided with two branches, by which it is connected, by means of lengths of flexible tubing O³ O⁴, to the nozzles $i^8$ on the admission-valves I I'.

If the engine is to be worked by petroleum vapor, the liquid petroleum is introduced in a small stream into the funnel-mouthed opening T' of a pipe, T, that passes along the cylinder inside the water-jacket, at the end of which it communicates with the pipe O, as shown at Fig. 1. The small stream of liquid petroleum in flowing along the pipe T will become volatilized by the heat of the water in the water-jacket, and, mixing with a certain quantity of air, that also enters the funnel-mouth T, will flow through the pipes O and O¹ to the admission-valves I I'. The volatilization of the whole of the petroleum is still further insured by the additional heating it obtains on its passage through the pipe O¹ inside the water-jacket, and should any particles escape perfect volatilization, or become recondensed on their passage through the flexible pipes O³ O⁴ into the valves I I', they will become vaporized on their passage along the channels $i^6$ by the heat of the flame $i^{12}$ playing round the valve-stem $i^3$. The flame $i^{12}$ may in this case be supplied from a special petroleum-lamp, or from ordinary coal-gas. Although a certain amount of air will be mixed with the petroleum vapor, as described, yet a further air-supply will be required for the explosive charge, and as in this case it will be necessary also to heat such air-supply before it mixes with the petroleum vapor, I introduce it through an opening, U¹, in the cylinder-jacket, Fig. 2, into a pipe, U, inside the jacket, where it becomes heated, and whence it is led, through flexible tubes U², to the end of the passages $i^5$ of the admission-valves. Here the air also becomes further heated by the flame $i^{12}$.

By causing the air and gas to pass through pipes in the water-jacket so as to take up heat from the water, as described, the advantages will be gained that, first, a saving of heat, otherwise lost, will be effected; and, secondly, the quantity of cold water required will be reduced in consequence of the refrigerating action produced by the evaporation of the petroleum upon the water. The volatilization of the liquid petroleum might also be effected by conducting it through small pipes inside a chamber, into which the hot products of combustion are made to issue from the passages L, or by causing the products of combustion to pass over the exterior of and through pipes in a chamber containing porous material saturated with petroleum.

For effecting the circulation of water through the working piston and piston-rod, as before mentioned, the following arrangement is employed: Inside the hollow piston-rod is a pipe, V, extending into the piston, where it is provided with a brach, V¹, Fig. 1, leading into the body of the piston. At the front end of the piston-rod this pipe carries an upright branch, V², terminating in a small receptacle, V³, (shown to an enlarged scale at Fig. 9.) As the piston arrives at the end of its back stroke, the stem W¹ of a small valve, W, closing an opening in the end of the water-jacket A¹, comes in contact with the side of the receptacle V³, whereby the valve is forced from its seat, thus allowing a certain quantity of water to flow from the water-jacket into the receptacle, whence it passes down the branch V², pipe V, and branch V¹, into the piston. At the same time water escapes from the piston at top through the pipe V⁴ into the space in the hollow piston-rod surrounding the pipe V, flowing to the front end of the piston-rod, and escaping through the outlet V⁵ into a trough, V⁶, that conducts it away. Cold water is supplied to the water-jacket A¹ through the pipe A⁴, Fig. 4.

When the receptacle V³ moves away from the valve W on the piston B beginning its forward stroke, the valve is closed by means of a spring, W².

Having thus described the nature of my invention, and in what manner the same is to be performed, I claim—

1. A double-acting gas-engine, wherein a partial vacuum is formed by the expansion and cooling of the products of combustion alternately on each side of the working-piston, the atmospheric pressure on the other side of the piston producing motive power, substantially as herein described.

2. A double-acting gas-engine consisting of a cylinder open at both ends to the atmosphere, and having a working piston, on each side of which is a loose piston, so arranged that at the end of each stroke the one loose piston, by the explosion of a charge, is propelled to the end of the cylinder without doing work, and is held there while the gaseous products of combustion contract, and the working piston, together with the second loose piston, is caused by atmospheric pressure to perform its stroke, substantially as herein described.

3. In a double-acting gas-engine, the cylinder A, with splayed open ends A², operating in combination with the working piston B and two loose pistons, F F', having conical segment-rings $f^5$, substantially as herein described.

4. In a double-acting gas-engine, the loose pistons F F', and a device for arresting the motion of said pistons to form a space for the explosive gas, operating alternately in combination with the piston B as working pistons, substantially as herein described.

5. In a double-acting gas-engine, the method of effecting the simultaneous expulsion of the products of combustion on one side of the working piston, and the drawing in of an explosive charge on the other side of the piston, substantially as herein described.

6. In a double-acting gas-engine, the working piston B with rod G, operating in combination with the loose pistons F F' in such manner that, as the piston B toward the end of its stroke approaches the one loose piston, so as to expel the products of combustion, the drawing in of the next explosive charge is simultaneously effected by arresting the motion of the second loose piston, substantially as herein described.

7. In a gas-engine, a loose piston propelled by the explosion, in combination with devices for wedging said piston, whereby it is held at the end of its stroke by absolute counter-pressure exerted thereon by the cylinder-surface, as distinguished from mere frictional contact, substantially as herein described.

8. The loose piston F with cylindrical part $f^1$ fitting with packing $f^2$ against the cylinder, and coned part $f^4$ with conical segment-ring $f^5$, controlled by springs $f^7$, and operating, in combination with the coned ends A² of the cylinder A, substantially as herein described.

9. In combination with the loose pistons, a broad ring of leather or other material, $f^2$, held at its middle by a ring, $f$, so that while the piston can move loosely in the cylinder, the pressure acting on the leather ring on the one side or the other of the piston will insure its working air-tight, substantially as herein described.

10. In combination with the loose pistons and the segment-ring for wedging the same in the cylinder, a device or devices for releasing the loose piston when pushed by the working piston, substantially as described.

11. The yielding annular buffer-plates M, operating, in combination with the pistons F, for effecting a close contact between them and the working piston, substantially as herein described.

12. The method of regulating the power of gas or petroleum engines by entirely cutting off the supply of combustible gas or vapor when the engine is running above its normal speed, while the working piston remains continuously in motion, substantially as herein described.

13. The combination of a governor, the valve of the gas-supply-pipe, and suitable intermediate mechanism for causing the governor to fully open or close the gas-supply, whereby a uniform quantity of gas for each charge is insured, substantially as herein described.

14. The valve P with stem P¹ and head P², operating, in combination with the governor Q and projection R', so that the governor only serves to bring parts into action, whereby the gas-supply is either entirely closed or fully opened, substantially as herein described.

15. In combination with the gas-supply pipe of a gas or vapor engine, the flap-valve S, provided with an adjustable weight, S', substantially as and for the purpose specified.

16. The admission-valve apparatus I, with inlets for both gas and air formed in the valve and valve-stem itself, and so arranged that by the closing of the valve the gas and air supply are simultaneously cut off, substantially as herein described.

17. In admission-valve apparatus to gas or petroleum engines, the gas-jet $i^{12}$ burning in the chamber $i^4$, with air-holes $i^{13}$ and chimney $i^{14}$, the said gas-jet being made to ignite the charge in the engine-cylinder by causing a portion of the flame to be conveyed by means of the disk $i^{16}$ into the valve-chamber, substantially as herein described.

18. The admission-valve apparatus I, with valve $i^2$, air and gas passages $i^5$ $i^6$ $i^7$, chambers $i^1$ $i^4$, aperture $i^{15}$, disk $i^{16}$, and gas-jet $i^{12}$, arranged and operated by means of the rod K and spring $k^2$, as herein described.

19. An admission-valve for air or gas engines provided with inlet-passages for air and gas, said passages being heated by the flame that ignites the charge, substantially as specified.

20. The hollow piston B and piston-rod B', supplied with water from the water-jacket of the cylinder by the valve W, receptacle $V^3$, and pipes $V^2$ V $V^1$, substantially as herein described.

21. The double-acting gas or petroleum engine, consisting of the cylinder A, pistons B F F', admission-valves I I', and regulating-valve P, all combined and operating as herein described.

In testimony whereof I have signed my name to this specification in the presence of two subscribing witnesses this 11th day of March, 1875.

GOTTLIEB WILHELM DAIMLER.

Witnesses:
   HENRY HÖLSCHER,
   EMIL LEHMANN.